(12) United States Patent
Rea et al.

(10) Patent No.: US 9,786,303 B1
(45) Date of Patent: Oct. 10, 2017

(54) LAYER FOR REDUCING MAGNETIC FIELD PROXIMATE A NEAR-FIELD TRANSDUCER

(71) Applicant: Seagate Technology LLC, Cupertino, CA (US)

(72) Inventors: Christopher J. Rea, Edina, MN (US); Hua Zhou, Plymouth, MN (US); Jie Gong, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/204,469

(22) Filed: Jul. 7, 2016

Related U.S. Application Data (60) Provisional application No. 62/189,811, filed on Jul. 8, 2015.

(51) Int. Cl.
  *G11B 5/02* (2006.01)
  *G11B 11/00* (2006.01)
  *G11B 5/31* (2006.01)
  *G11B 5/00* (2006.01)

(52) U.S. Cl.
  CPC ...... *G11B 5/314* (2013.01); *G11B 2005/0021* (2013.01)

(58) Field of Classification Search
  CPC ... G11B 7/37; G11B 2220/90; G11B 2220/33; G11B 2005/0005; G11B 5/314; G11B 2005/0021; G11B 11/10532; G11B 5/855; G11B 5/743; G11B 2005/001; B82Y 10/00
  USPC .......... 360/59, 313; 369/13.13, 13.33, 13.02, 369/13.32
  See application file for complete search history.

(56) References Cited

U.S. PATENT DOCUMENTS

| | | | |
|---|---|---|---|
| 8,164,855 B1 | 4/2012 | Gibbons et al. | |
| 8,472,288 B1 | 6/2013 | Wolf et al. | |
| 8,619,516 B1 * | 12/2013 | Matsumoto | G11B 5/314 369/13.33 |

* cited by examiner

*Primary Examiner* — Nabil Hindi
(74) *Attorney, Agent, or Firm* — Hollingsworth Davis, LLC (57) ABSTRACT

An apparatus comprises a magnetic pole and a near-field transducer positioned at or near a media-facing surface and is separated from the magnetic pole, the near-field transducer configured to generate a thermal spot. The apparatus further comprises a layer proximate the magnetic pole and the near-field transducer, and the layer is configured to reduce a magnetic field proximate a center of the thermal spot.

20 Claims, 6 Drawing Sheets

LAYER FOR REDUCING MAGNETIC FIELD PROXIMATE A NEAR-FIELD TRANSDUCER

RELATED PATENT DOCUMENTS

This application claims the benefit of Provisional Patent Application Ser. No. 62/189,811 filed on Jul. 8, 2015, to which priority is claimed pursuant to 35 U.S.C. §119(e), and which is incorporated herein by reference in its entirety.

SUMMARY

Embodiments of the disclosure are directed to an apparatus comprising a magnetic pole and a near-field transducer positioned at or near a media-facing surface that is separated from the magnetic pole, and a layer proximate to both the magnetic pole and the near-field transducer. The near-field transducer is configured to generate a thermal spot, and the layer is configured to reduce a magnetic field proximate a center of the thermal spot.

Other embodiments are directed to an apparatus comprising a magnetic pole and a near-field transducer positioned at or near a media-facing surface that is separated from the magnetic pole, and a magnetic layer between the magnetic pole and the near-field transducer. The near-field transducer is configured to generate a thermal spot, and the magnetic layer has a Curie temperature between about 200° C. and about 700° C. and is configured to reduce a magnetic field proximate a center of the thermal spot.

Further embodiments are directed to an apparatus comprising a magnetic pole and a near-field transducer positioned at or near a media-facing surface that is separated from the magnetic pole, and a saturable layer between the magnetic pole and the near-field transducer. The near-field transducer is configured to generate a thermal spot, and the saturable layer has a magnetic moment between about 1 T Bs and about 2.4 T Bs and is configured to reduce a magnetic field proximate a center of the thermal spot.

These and other features and aspects of various embodiments may be understood in view of the following detailed discussion and accompanying drawings.

DETAILED DESCRIPTION

The present disclosure generally relates to writing data with a heat assisted magnetic recording (HAMR) device. This technology, also referred to as energy-assisted magnetic recording (EAMR), thermally-assisted magnetic recording (TAMR), and thermally-assisted recording (TAR), uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to paramagnetic effects that can lead to data errors.

Writing data to magnetic media using HAMR is influenced by competing gradients—thermal and magnetic. Under most operational conditions, the magnetic gradient opposes the, larger, thermal gradient in the overall device, or head, field gradient. The heated (thermal) spot is closely aligned to the head field at the writing point to improve written track quality. However, the thermal spot produces curved transitions that can reduce track capability at high track densities. The curvature is the result of a flat magnetic profile convoluted with a curved thermal spot. Reducing the interference of the magnetic field gradient with the total head gradient proximate the center of the thermal spot provides for flattened transitions and better alignment between the thermal spot and the head field.

Figure 1:
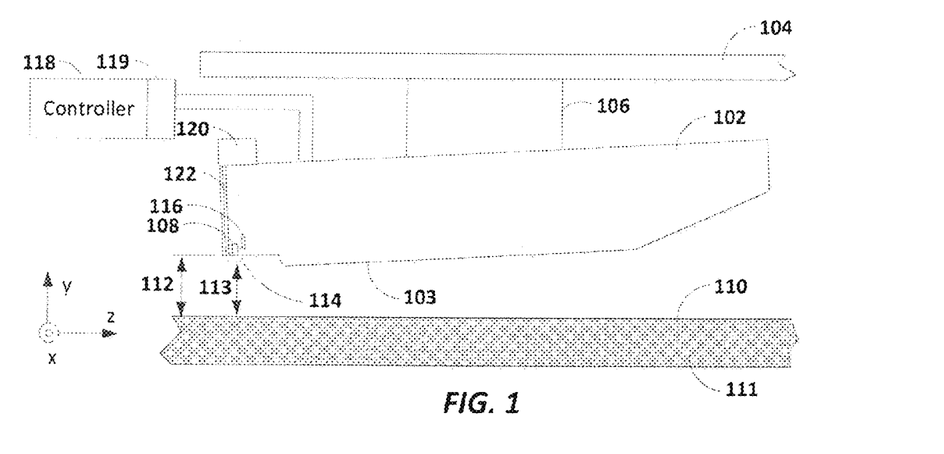
FIG. 1 is a block diagram of a hard drive slider and media arrangement according to an example embodiment.

In reference now to FIG. 1, a block diagram shows a side view of a read/write head 102 according to an example embodiment. The read/write head 102 may be used in a magnetic data storage device, e.g., hard disk drive. The read/write head 102 may also be referred to as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

Region 114 is a "close point" of the read/write head 102, which is generally understood to be the closest point of contact between the read/write transducers 108 and the magnetic recording medium 111, and generally defines the head-to-media spacing (HMS) 113. To account for both static and dynamic variations that may affect slider flying height 112, the read/write head 102 may be configured such that a region 114 of the read/write head 102 can be configurably adjusted during operation in order to finely adjust the head-to-media spacing 113. This is shown in FIG. 1 by dotted line that represents a change in geometry of the region 114. In this example, the geometry change may be induced, in whole or in part, by an increase or decrease in temperature of the region 114.

The illustrated read/write head 102 is configured as a HAMR device, which includes additional components that generate heat near the read/write transducer 108. These components include laser 120 (or other energy source) and waveguide 122. The waveguide 122 delivers light from the laser 120 to components near the read/write transducers 108. These components are shown in greater detail in FIG. 2.

Figure 2:
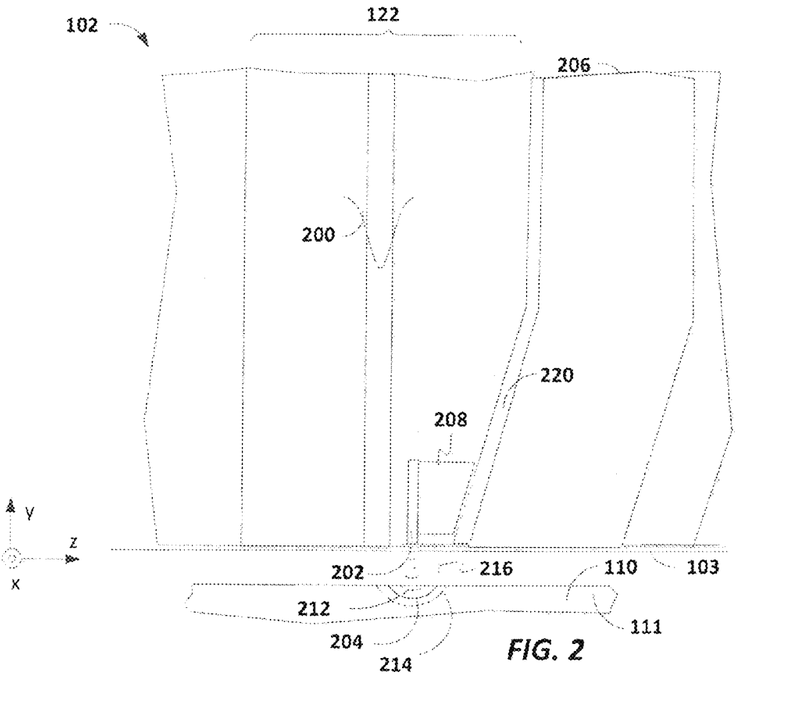
FIG. 2 is a cross-sectional view of a read/write head according to an example embodiment.

In FIG. 2, a block diagram illustrates a cross-sectional view of the HAMR read/write head 102 according to an example embodiment. The waveguide 122 receives electromagnetic energy 200 from the energy source, and couples the energy 200 to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small thermal spot 204 on the surface 110 of medium 111. A magnetic write pole 206 causes changes in magnetic flux near the media-facing surface 103 in response to an applied current. Flux from the write pole 206 changes a magnetic orientation of the thermal spot 204 as it moves past the write pole 206 in the downtrack direction (z-direction). A layer 220, or seedlayer, may be proximate the write pole 206 to reduce a magnetic field proximate a center of the thermal spot 204 and is discussed further below. An edge of the thermal spot 204 defines a transition position 216 that may be defined relative to the NFT 202 and/or the write pole 206.

Generally, the transition position 216 represents a boundary where the magnetic field can reliably write data to the medium due to the thermal spot 204 lowering magnetic coercivity sufficiently. Dynamic thermal conditions can affect HMS and laser power, which in turn can affect the size of the thermal spot 204. As indicated by dashed lines 212, 214, variations in the size of the hotspot can cause changes in the transition position 216, and thereby affect where the boundaries between bits are written to the medium 111.

Figure 3:
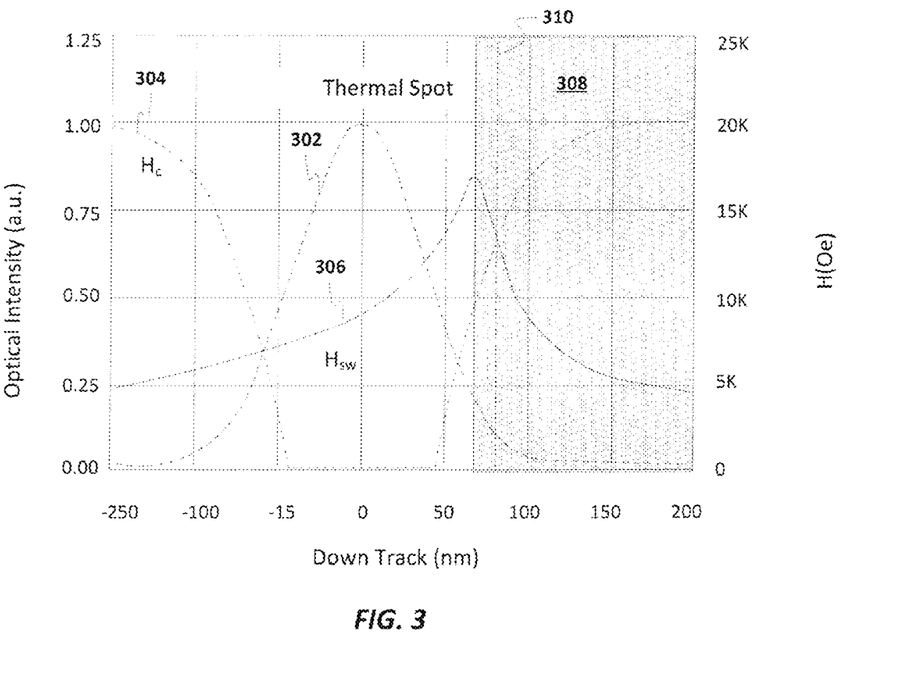
FIG. 3 is a graph illustrating factors affecting transition position/location of a read/write head according to an example embodiment.

In FIG. 3, a graph illustrates how various factors can affect transition position in a read/write head according to an example embodiment. Curve 302 represents optical intensity of the hot spot applied to the recording medium, and is centered in the downtrack direction around the center of the NFT, which in this graph used the reference point where down track location is zero. Curve 304 represents the coercivity $H_C$ of the recording medium aligned with the read/write head, such that coercivity is minimum directly below the NFT. Curve 306 represents the strength of the magnetic field $H_{SW}$ generated by the write pole, the location of the write pole being indicated by shaded area 308. Line 310 indicates the transition location, which is a boundary along which $H_C$=Hsw.

The transition location 310 is influenced by the combination of the write pole magnetic field and the media coercivity and the transition identifies where the transitions of bits will be written (e.g., frozen in) on the recording medium where the rising media coercivity (Hc) cooling from the thermal spot crosses the effective head field threshold. The total effective transition quality is determined by the magnetic and thermal gradients, which may be found by taking derivatives of curves 304 and 306. While the thermal gradient dominates, the magnetic gradient is typically around 250 Oe/nm or at least ten percent opposing the thermal gradient. Moreover, the magnetic gradient suppresses the total gradient, for example, from approximately 650 Oe/nm to 500 Oe/nm. The total gradient of the written transition, which is the product of the total gradient in the center of the track and the loss in gradient across the track, can be increased by increasing laser power and NFT temperatures. Reducing the magnetic gradient can improve the written track quality by flattening flux boundaries between written bits. If the described techniques for reducing the magnetic gradient also increase the total gradient in the center of the track, for the same performance, less power would need to be applied. Similarly, if the described techniques for reducing the magnetic gradient improve the cross-track gradient (i.e., making it more homogenous in the cross-track direction), then the peak operating temperature at the center of the track could be reduced while achieving the same performance as without the described techniques. The reductions in laser power and/or peak temperature can increase the reliability and lifetime of the recording system. The flux boundaries are further discussed below in connection with these techniques.

Figure 4:
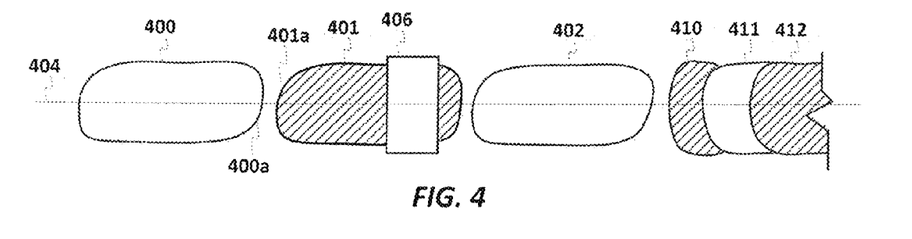
FIG. 4 is a block diagram showing bit patterns on a recording medium and a reader used therewith according to example embodiments.

In FIG. 4, a block diagram illustrates an example bit pattern formed by a HAMR writer according to example embodiments. Individual bits 400-402 are written on a track, as indicated by track centerline 404. The different shading indicates different orientation of magnetic flux, so in this example the bits 400-402 would be alternating between one and zero. Multiple bit regions (e.g., regions of successive ones or zeros) may be respectively longer than the indicated single bit regions 400-402. As seen in this illustration, flux boundaries, or transitions, between the bits 400-402 have curved edges, e.g., edges 400a, 401a. The curved transitions result from the curved thermal profile of a thermal spot combined with a rectangular head profile.

At the illustrated linear density of bits 400-402 (which may be expressed as bits-per inch or BPI), the rounding of the inter-bit edges, e.g., edges 400a, 401a, may not pose significant challenges during read-back, because the length of the bits in the downtrack direction is significantly larger than the amount of curvature When the read transducer 406 is positioned over the bits 400-402, the bits are sufficiently large that the decoder can account for variability in transitions caused by the rounding. As linear density is increased, the effects of curvature of inter-bit boundaries can become more significant. This is shown by bits 410-412, which are written at a higher BPI than bits 400-402. For bits 410-412 the variability in edge detection due to rounding is larger compared to the downtrack bit length, which can increase error rates during read-back.

Due to the curvature of the inter-bit boundaries for bits 410-412, a portion of the read transducer can be over adjacent regions of bits having opposite magnetic orientation. This may lead to variations or errors in detecting the inter-bit transitions, which may ultimately lead to errors reading the recorded data due to the small downtrack length of an individual bit. Flattening the flux boundaries by reducing the magnetic gradient may lead to fewer such variations and errors.

Figure 5:
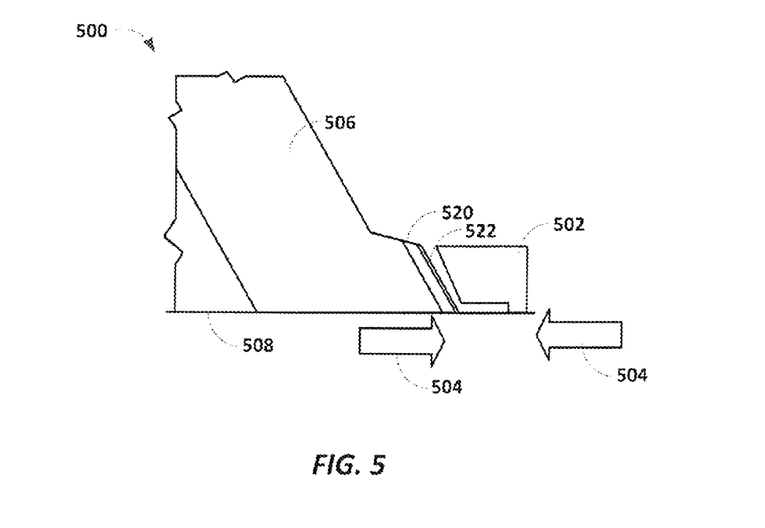
FIG. 5 is a block diagram of a layer proximate a write pole and a near-field transducer, in accordance with various embodiments.

Turning now to FIG. 5, a close up portion of a write head 500 is illustrated. The write head 500 includes a layer 520 proximate a write pole 506 and a NFT 502. The layer 520 is located adjacent, or under, the write pole 506 and close to the NFT 502. The layer 520 is thin having a thickness along the ABS 508 of about 0.1 to about 30 nm or from about 0.1 to about 20 nm. Based upon the materials comprising layer 520, the layer 520 suppresses the magnetic gradient at the edge of write pole 506. For example, a lower moment (e.g., between about 1 T Bs and about 2.4 T Bs), higher permeability layer, or seedlayer, saturates under write current operation and in turn reduces the interference of the magnetic field gradient with the total head gradient at the transition location. Example materials for a lower moment, higher permeability layer 520 may include alloys of Ni and Fe, Co, or FeSiAl compositions. While the total effective head field also drops as a result, the spacing between the NFT 502 and write pole 506 (illustrated by arrows 504) can be adjusted to compensate for the total effective head field loss at the writing location.

Layer 520 can also be combined with a small layer 522 of optically reflective material between layer 520 and NFT 502 that would partially reduce the absorption and thermal gradient loss experienced by small (e.g., 15 nm) spacing between an NFT and write pole. Example materials for such an additional layer would be of the same subset as those selected for a disk or NFT, e.g., gold, alloys of gold, etc. Previous attempts to reduce the NFT to write pole spacing, without layer 520 or layer 522, resulted in strong interaction with the optical gradient and thermal profile due to interference between the write pole and the NFT. This caused the total gradient to drop and the head field at writing to be low, thereby further causing poor freezing in of the written transition, e.g., increasing jitter.

Alternatively, or in addition to the low moment material, layer 520 can be comprised of a low Curie temperature ($T_C$) material to provide a naturally self-aligned reduction in field gradient and field magnitude close to the center of a NFT thermal spot. The material composition is selected such that the Curie temperature of the layer 520 is in the regime of the head temperature under high levels of applied laser power. For example, a low Curie temperature may be between about 200-700 degrees C., and in some embodiments approximately 300 degrees C.

Example materials for a low Curie temperature layer 520 include transition metals and their binary alloys, such as FeNi, NiMn, FeV, FeCr, FeCo, CoNi, NiCu. Also, ternary or quaternary transition metal alloys such as FeNiCr, FeNiMn, FeNiCrMn, FeNiCu, FeNiCrCu, and NiFeMnCu are suitable. Further materials include doped other main group elements with each of the above examples, such as, but not limited to, FeNiCrSi, FeNiMnCrSi, FeNiCrAl, and FeNiMnCrAl. Moreover, rare earth (RE) doped metals and alloys of any of the above examples are suitable where the rare earth metal could be Dy, Sm, Y, Gd, etc.

As may be seen, there is a spectrum of materials that provide the $T_C$ to be tuned over a larger temperature range beginning at room temperature of 10 degrees C. using doped $Ni_{20-50}Fe_{40-70}X_{0-20}$ (where X could be one or more of Cr, Mn, Si, Mo, Al, Zn, Cu, Sn, Pd or Au; or Dy, Sm, Y, Gd) up to 900 degrees C. with undoped CoFe compositions. For example, FeNi alloys can be tuned with $T_C$ varying from about 200-700 degrees C. Substantial thermal gradients exist between the write pole and the NFT, and the thermal gradient at the layer 520 is in the regime of 0.5-1 K/nm. In NiFe the Ms can drop by five percent per degree C. increase, and that effect could be enhanced if desired by putting a thin dielectric or poor band gap match layer to increase the thermal gradient. When layer 520 has a moment less than 2.4 T, a broad selection of materials such as binary alloys and ternary/quaternary alloys, as set forth above, are available that can be compositionally selected to be between about 200 and about 700 degrees C., with a moment between about 0.5 and about 2.0 T. This broad selection of materials also has low susceptibility to corrosion under elevated temperatures, such as those experienced during HAMR operating conditions (e.g., in excess of 400 degrees C.). Thus, presence of such materials can enhance resistance to corrosion relative to a layer comprised of other materials.

In addition, a low $T_C$ layer 520 can be patterned in the cross-track direction to accentuate the alignment effect. Additional one or more optical underlayers and/or one or more dielectric overlayers can be added to low $T_C$ layer 520 to reduce optical absorption (using underlayer(s)) and enhance the thermal gradient (using overlayer(s)). While most of the above-listed materials have absorption similar to typical write pole designs (without a low $T_C$ layer), including optically compliant seedlayers under the write pole would aid absorption, e.g., using gold and/or coupling layers. This would allow for further freedom in selecting materials for the low moment/low $T_C$ layer.

When laser power is swept from low to high, the apparent NFT to write pole spacing increases, locally in the region closest to the write pole, effectively creating a tunable wrapped pole. Using layer 520 however, creates a more tunable structure and offers the potential to diagnose definitively the head temperature with high accuracy during operation as compared with a fabricated wrapped pole. To provide a spectrum of Curie temperatures, a series of doping levels can be used with minimal change in the optical properties of the NFT. For each layer design, the laser power can be swept from low to high and the transition location monitored. When the transition location makes an abrupt jump, the $T_C$ of the layer 520 has been reached. Thus, a $T_C$ for the layer 520 can be selected to mitigate net head field loss while providing temperature control feedback and flattening the curved transitions.

Figure 6:
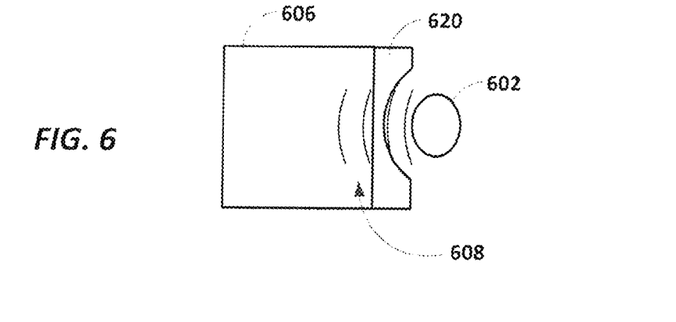
FIG. 6 is a block diagram of a low $T_C$ layer proximate a write pole and a near-field transducer, in accordance with various embodiments.
Figure 7:
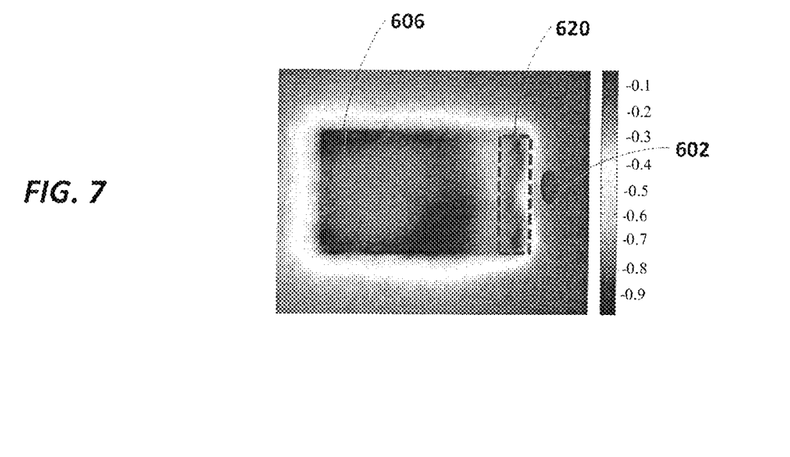
FIG. 7 is a plot of the effect the low $T_C$ layer of FIG. 6 on the total head field, in accordance with various embodiments.

Since layer 520 is between 0.1 and 30 nm, the net field loss due to the lower starting moment can be accommodated by geometry optimization. FIG. 6 illustrates a low $T_C$ layer 620 proximate an NFT 602 and a write pole 606. The layer 620 flattens out the bit transitions 608 generated by the NFT 602. This is further illustrated in FIG. 7, which shows the effect the low $T_C$ layer 620 has on the total head field. Notably, the field aligned with the center location of NFT 602 is reduced. This reduction can be accomplished with multilayers of high moment (high $T_C$) and lower moment (low $T_C$) layers and dielectrics to shape the head field gradient and cross track profile as well as allow for patterned layers adjacent, or under, the write pole 606.

Figure 8:
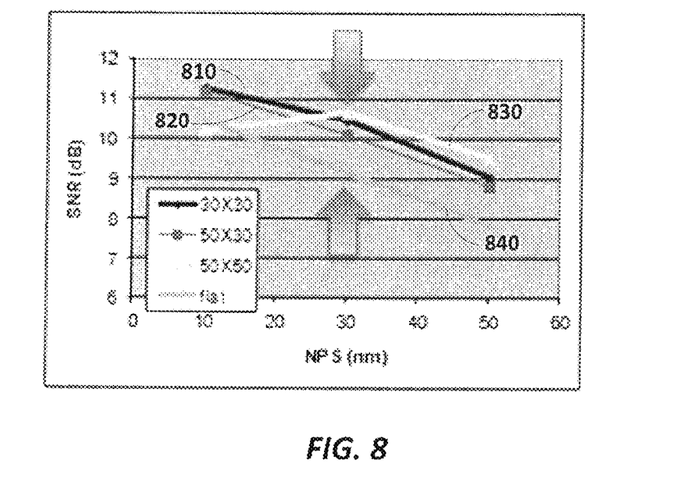
FIG. 8 is a chart of signal to noise ratio gain with respect to near-field transducer to write pole spacing for various magnetic field profile shapes, in accordance with various embodiments.

The changing configuration of the magnetic field profile also impacts the signal to noise ratio gain, as shown in FIG. 8. Signal to noise ratio gain as a function of the NFT to pole spacing (NPS) is illustrated for various magnetic field shapes. A 30×30 field is represented by line 810, a 50×30 field is represented by line 820, a 50×50 field is represented by line 830, and a flat field is represented by line 840. The chart of FIG. 8 indicates an NPS of about 30 nm.

Figure 9:
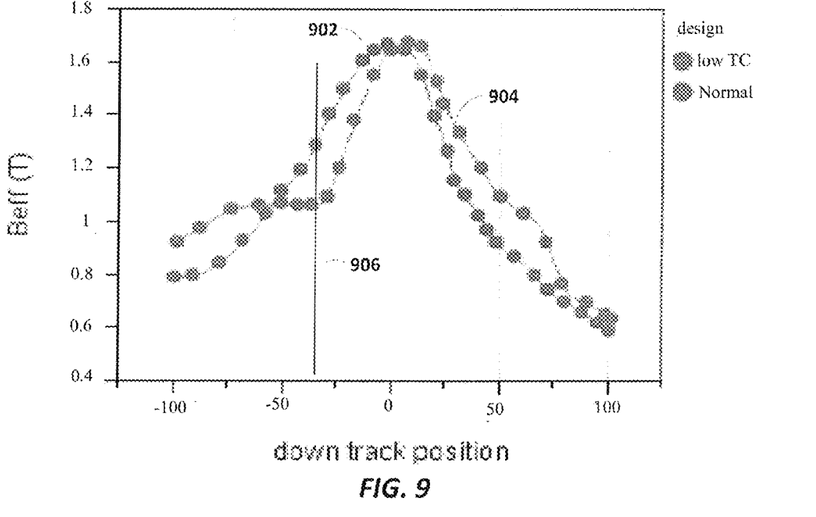
FIG. 9 is a chart of changing magnetic field profiles due to a low $T_C$ layer, in accordance with various embodiments.

A low $T_C$ layer can shape the effective head field profile in the centerline of the written track, as shown in FIG. 9. The low $T_C$ layer provides a reduced moment in the NFT region to shape the magnetic field profile. Curve 902 represents the profile of a head design without a low moment/low $T_C$ layer; whereas, curve 904 represents the profile of a head design with a low $T_C$ layer such as shown in FIG. 6. The low $T_C$ design used for curve 904 is able to target smaller physical NFT to write pole spacing (e.g., about 15 nm) than typical spacing designs. While introducing the low moment/low $T_C$ layer could reduce overall head field if the physical NFT to write pole spacing were maintained, as compared with a design absent such layer, the layer allows for the spacing to be slightly reduced to maintain a similar spacing incorporating the layer. As shown, the head field gradient is also reduced at the writing point 906 so that, for parity of head field, the effective gradient increases. By selecting materials to comprise a layer of low $T_C$, low moment, and adjusting the thickness of the layer, the magnetic gradient can be reduced and head field maintained, but shaped in the cross-track direction to reduce curvature of the written bit transitions. The following chart illustrates various combinations of thickness and moment for such a selection.

Figure 10:
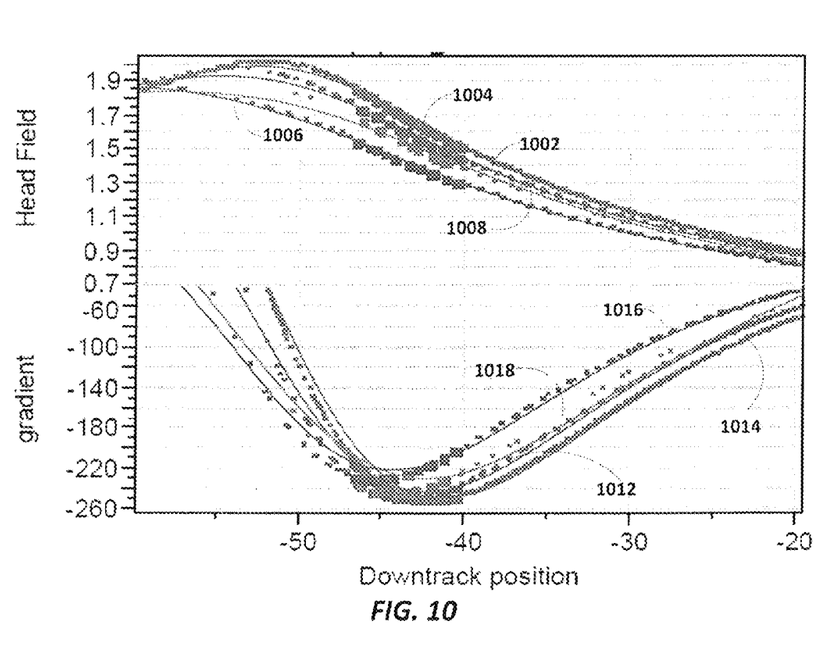
FIG. 10 is a graph showing head fields and gradients with respect to downtrack position for read/write heads having layers with various thicknesses and magnetic moments, in accordance with various embodiments.

FIG. 10 is a chart fitting and differentiating effective head fields to provide gradients with respect to downtrack position for read/write heads having respective layers, similar to layer 520 of FIG. 5, of differing thicknesses and low magnetic moments. For example, curves 1002-1008 represent the effective head fields for respective layers while curves 1012-1018 represent the corresponding gradients for those respective layers.

Curves 1002 and 1012 represent a read/write head having a layer with a thickness along the ABS of 10 nm and a magnetic moment of 1.6 T. Curves 1004 and 1014 represent a read/write head having a layer with a thickness along the ABS of 10 nm and a magnetic moment of 2.4 T. Curves 1006 and 1016 represent a read/write head having a layer with a thickness along the ABS of 20 nm and a magnetic moment of 1.0 T. Curves 1008 and 1018 represent a read/write head having a layer with a thickness along the ABS of 20 nm and also having a magnetic moment of 1.6 T, similar to the layer represented by curves 1002 and 1012. Each of the curves illustrates that the low moment layer causes both the head field and the gradient to decrease.

Without optimizing a writer, recording at a fixed location can provide gradient suppression (and so gains) as large as 60 Oe/nm. Alternatively, recording at a fixed head field can provide gains around 30 Oe/nm. A realistic scenario falls somewhere between these two examples. The equivalent impact of thermal gradient is around 0.05 to 0.1 K/nm, or between one and three percent of the total effective gradient gain (assuming Tg can reach 6 K/nm). With further geometric engineering, that impact can be increased, for example, if combined with more efficient writer designs such as beveled poles, increased writer flare angles, etc. The potential effect could increase closer to 100 Oe magnetic gradient or five percent of the total gradient. This may even be an underestimate.

Figure 11:
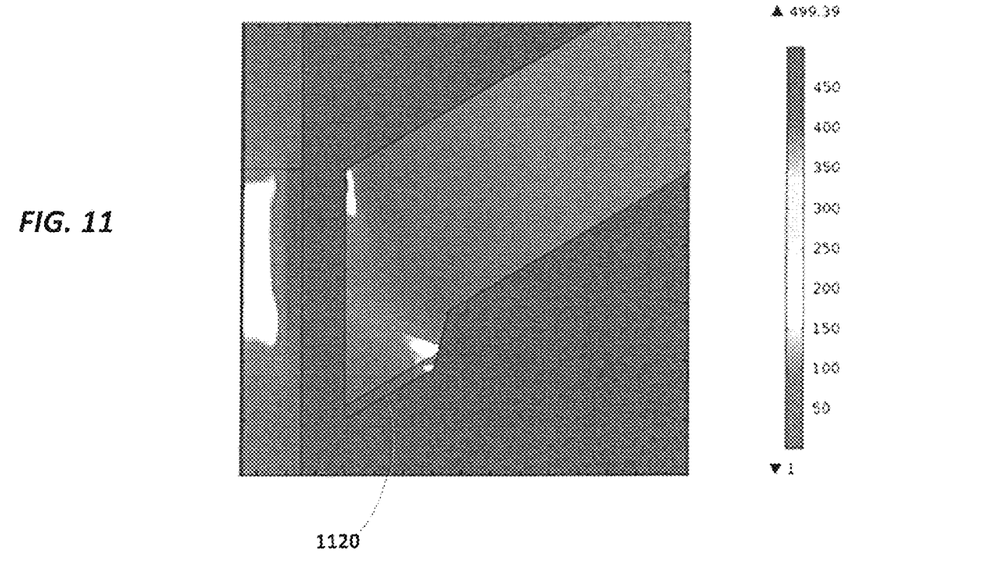
FIGS. 11-12 are plots of permeability and Ms for a read/write head having a low moment layer, in accordance with various embodiments.
Figure 12:
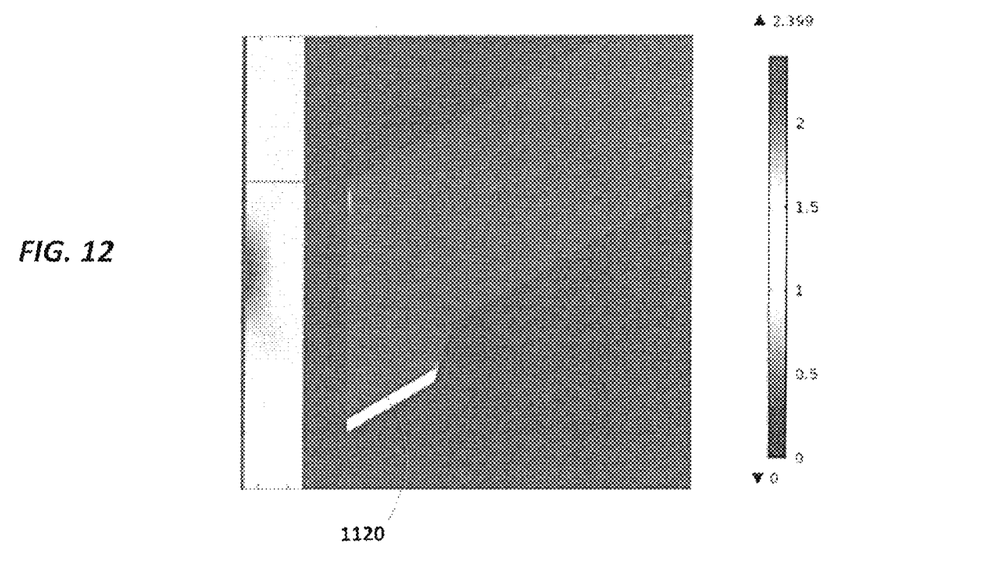

FIGS. 11-12 illustrate permeability and Ms plots, respectively, for a write pole design having a layer 1120 with a moment of 1.0 T. This design suggests that layer 1120 at the ABS (assuming a media that has a soft underlayer) can, with high write currents, be driven close to saturation. For example, FIG. 11 shows a permeability of close to 1.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus comprising:
a magnetic pole;
a near-field transducer positioned at or near a media-facing surface and separated from the magnetic pole, the near-field transducer configured to generate a thermal spot; and
a layer proximate to both the magnetic pole and the near-field transducer and not in contact with the near-field transducer, the layer configured to reduce a magnetic field proximate a center of the thermal spot.

2. The apparatus of claim 1, wherein the layer comprises material having a Curie temperature between about 200° C. and about 700° C.

3. The apparatus of claim 1, wherein the layer comprises material having a magnetic moment between about 1 T Bs and about 2.4 T Bs.

4. The apparatus of claim 1, wherein the layer comprises at least one of alloys of Ni and Fe, Co, and FeSiAl compositions.

5. The apparatus of claim 1, wherein the layer comprises at least one of FeNi, NiMn, FeV, FeCr, FeCo, CoNi, NiCu, FeNiCr, FeNiMn, FeNiCrMn, FeNiCu, FeNiCrCu, NiFeMnCu, FeNiCrSi, FeNiMnCrSi, FeNiCrAl, FeNiMnCrAl, Dy, Sm, Y, and Gd.

6. The apparatus of claim 1, wherein the layer has a thickness along the media-facing surface from about 0.1 to about 30 nm.

7. The apparatus of claim 1, wherein the layer is between a beveled surface of the write pole and the near-field transducer.

8. The apparatus of claim 1, further comprising an optically reflective layer proximate the layer and the near-field transducer.

9. The apparatus of claim 2, wherein the layer is patterned in a cross-track direction.

10. An apparatus comprising:
a magnetic pole;
a near-field transducer positioned at or near a media-facing surface and separated from the magnetic pole, the near-field transducer configured to generate a thermal spot; and
a layer between the magnetic pole and the near-field transducer and not in contact with the near-field transducer, the layer configured to flatten bit transitions generated by the near-field transducer.

11. The apparatus of claim 10, wherein the layer comprises material having a Curie temperature between about 200° C. and about 700° C.

12. The apparatus of claim 10, wherein the layer has a thickness along the media-facing surface from about 1 to about 30 nm.

13. The apparatus of claim 10, wherein the layer is patterned in a cross-track direction.

14. The apparatus of claim 10, wherein the layer further comprises one or more optical underlayers and dielectric overlayers.

15. The apparatus of claim 10, wherein the layer has a magnetic moment from about 1.5 to about 2.0 T.

16. An apparatus comprising:
a magnetic pole;
a near-field transducer positioned at or near a media-facing surface and separated from the magnetic pole, the near-field transducer configured to generate a thermal spot; and
a layer between the magnetic pole and the near-field transducer and not in contact with the near-field transducer, the layer configured to substantially saturate under write current operation.

17. The apparatus of claim 16, wherein the layer has a magnetic moment from about 1.5 to about 2.0 T.

18. The apparatus of claim 17, wherein the layer comprises at least one of FeNi, NiMn, FeV, FeCr, FeCo, CoNi, NiCu, FeNiCr, FeNiMn, FeNiCrMn, FeNiCu, FeNiCrCu, NiFeMnCu, FeNiCrSi, FeNiMnCrSi, FeNiCrAl, FeNiMnCrAl, Dy, Sm, Y, and Gd to enhance resistance to corrosion.

19. The apparatus of claim 16, wherein the layer has a thickness along the media-facing surface from about 0.1 to about 20 nm.

20. The apparatus of claim 16, further comprising an optically reflective layer proximate the layer and the near-field transducer.

\* \* \* \* \*